United States Patent [19]

Loureiro Benimeli

[11] Patent Number: 5,518,021
[45] Date of Patent: May 21, 1996

[54] SYSTEM FOR INFLATING TIRES

[76] Inventor: Fermin J. Loureiro Benimeli, Sor Eulalia de Anzizu, 34, 5º, E-08034 Barcelona, Spain

[21] Appl. No.: 211,394

[22] PCT Filed: Aug. 3, 1993

[86] PCT No.: PCT/ES93/00067

§ 371 Date: Apr. 1, 1994

§ 102(e) Date: Apr. 1, 1994

[87] PCT Pub. No.: WO94/03349

PCT Pub. Date: Feb. 17, 1994

[30] Foreign Application Priority Data

Aug. 4, 1992 [ES] Spain .................................. 9201635

[51] Int. Cl.$^6$ ............................. F17C 13/02; F17C 13/04
[52] U.S. Cl. ............................. 137/224; 141/94; 152/415; 222/3; 222/21
[58] Field of Search ............................. 141/94, 95, 197, 141/38; 152/415; 137/223, 224, 227; 222/3, 21

[56] References Cited

U.S. PATENT DOCUMENTS

| D. 691,747 | 1/1902 | Champ | 141/197 |
|---|---|---|---|
| 3,913,632 | 10/1975 | Dudar | 141/95 |
| 4,427,022 | 1/1984 | Forney | 137/224 |
| 4,694,409 | 9/1987 | Lehman | 364/558 |

FOREIGN PATENT DOCUMENTS

| 2592972 | 7/1987 | France | G05D 16/20 |
|---|---|---|---|
| 2613290 | 10/1988 | France | B60C 23/00 |
| 58-174051 | 10/1983 | Japan | B60S 5/04 |
| 2214678 | 9/1989 | United Kingdom | G06K 19/00 |

*Primary Examiner*—Michael W. Ball
*Assistant Examiner*—Francis J. Lorin
*Attorney, Agent, or Firm*—Dvorak and Traub

[57] ABSTRACT

System for inflating tires comprised of a pressure air supply apparatus with a series of push-buttons (2) for different pressures and completed with a series of collars (6) which may be mounted on the outside of the valve of the tire with identification or characteristics which match those of one of the push-buttons. The pressure air supply apparatus includes a control unit (12) which acts on a pressure inlet electrovalve (93) or on a pressure discharge electrovalve (95) said control unit (12) having an amplifier (14), a transducer (13), a converter (15) and a zero adjusting circuit formed by two potentiometers (16). Two air supply hoses (9) are each fitted at their ends with a mouthpiece (10) terminated by clamping elements which tend to move towards one of the inclined grooves (20) through the action of a pushing element (22) biased by a spring (23).

7 Claims, 3 Drawing Sheets

SYSTEM FOR INFLATING TIRES

BACKGROUND OF THE INVENTION

The present description relates to a system for inflating tires, which presents a series of important advantages over the means that are presently used for this purpose.

At present, the supply of air pressure to a tire is carried out by means of an apparatus which incorporates a hose having at its end a mouthpiece, a pressure indicator and a manually activated valve which permits introduction of air by pressure in the tire until the pressure indicator reaches the required pressure for the type of vehicle.

There also exist another type of apparatus for supplying air by pressure which includes two push-buttons and a display in which the operating pressure can be observed, said pressure being changeable to reach a determined pressure by means of one of the push-buttons which permits the increase of the pressure visualized on the display, of by means of the other push-button when it is desired to obtain a lower pressure.

In using any of the two systems it is necessary to know prior to the operation the pressure to which the tire should reach since said pressure varies depending on the vehicle to which the wheel is applied and the position of the latter in the front train or the rear train of the vehucle.

For this reason, before starting the tire inflating process, it would be necessary to look into tables in which the pressures of tires depending on the model of the vehicle are listed. Looking into said tables would cause, in the first place, loss of time and in the second place present a relative effectiveness since there exist vehicle models which do not appear on the list, and also when on a vehicle there ape mounted tires which are different to the original ones supplied by the manufacturer.

Another drawback which the known systems, and in to a higher degree the first mentioned system present is that the pressure supplied to the tire in not exact, but approximate due to the circumstances of the reading such as inclination of the pressure indicator which gives rise to an erroneous projection of the needle over the scale or similar circumstances.

It should be borne in mind that all these circumstances complicate considerably the inflating process of the wheels, since it is an operation which is carried out in very large intervals of time which results in that a very high percentage of vehicles would not contain the adequate pressure for their tires causing the consequent problems of excessive wearing off of the tires, a higher risk of accident and a higher consumption in the vehicle, and said inflating process can become even more difficult when the mouthpiece provided at the end of the hose of the air supplying apparatus presents a complex activating device which makes the fixing of the mouthpiece on the valve difficult, even when the valve is in an accesible place; since there exist vehicle models in which the valve is situated inside a cavity arranged in the hubcaps for which the conventional mouthpieces do not reach for connection with the valve without taking off the hubcaps.

Due to all these reasons, the inflatng process of tires is extremely cumbersome, and in order to simplify the same the system, object of the present invention, is proposed, which is composed of a pressure air apparatus which incorporates a plurality of push-buttons with pre-established pressures which cover a very wide range of pressures employed for inflating tires; said pressure air supply apparatus presenting two outlet hoses which are fitted at two fast coupling mouthpieces, apt to be fixed on two wheels corresponding to the same train or axis of the vehicle; said two hoses being connected to each other and with the machine in such a manner that the pressure supplied by each one is identical which assures that the two wheels of the same train or axis have identical pressures.

SUMMARY OF THE INVENTION

With the purpose of making the pressure supplied by the hoses, to correspond to the pressure indicated in any of the push-buttons previously pushed, the apparatus incorporates a transducer which receives the pressure of the outlet hoses, said transducer producing a differential tension, depending on the received pressure, which is amplified and applied to one of the inputs of an analog-digital convertor circuit in order to subsequently send the digitalized information of the pressure existing in the hoses to a control unit which carries out a comparison of said measurement with that of the pressure corresponding to the push-button previously selected, acting, as function of the data obtained in said comparison, upon an electrovalve which permits the inlet of more pressure to the hoses or to an electrovalve which permits the discharge of the pressure of the same; this control unit carries out successive comparisons and the corresponding actuations on one or the other electrovalve in order to bring close the pressure supplied by the hoses to the pressure pre-established through the push-button until said pressures coincide.

The control unit additionally comprises a zero adjusting circuit formed by two potentiometers.

Due to the problems which mouthpieces presently used in this type of apparatus produce, mouthpieces for fast coupling over the valve are provided in order to be mounted at the end of the hoses, which have closing means when they are not connected to the corresponding valves in such a form that if the inflating of only one of the tires is desired, only one hose is used while the other remains closed, thus the adjustment of the pressure of the tire becoming possible with the pressure selected through the push-button, and because if the automatic closing mouthpieces are not included one of the hoses would remain open thus the air supply apparatus cannot perform the compensation between the two hoses since one of the two is open thus giving rise to total deflating of the tire the pressure of which is intended to adjust.

In order to make possible the rapid and easy connection and disconnection of the mothpiece placed at the ends of the hoses to the valve of the vehicle, either when the latter is out of the hubcaps or when it is placed in a cavity defined therein, said mouthpiece is arranged to define a cylindrical configuration of reduced diameter and sufficient length in order to reach the valve in the case where the latter is located in a cavity, presenting inside the same closing means composed of a valve core which maintains the mouthpiece closed as long as the latter is not connected to the valve, and rapid connection means which permit the mouthpiece to engage onto the valve only by pressing the mouthpiece over the same, incorporating at the exterior thereof a sleeve which when driven towards the rear zone of the mouthpiece releases the latter.

In order to eliminate the loss of time which is caused by consulting tables for finding out the pressure corresponding to the vehicle of the user, the system is also equipped with a series of tubular collars, preferably of plastic material, each of which defining their own identifier characteristics which permit the correspondence of each of these characteristics with a determined pressure; each of the push-buttons of the air supply apparatus being provided with an indication of the pressure corresponding to each one and the identifier characteristics corresponding to each pressure, which permits that once a collar with characteristics representing the corresponding pressure is positioned on the valve of a tire, the user would not have to consult any tables, thus being sufficient for supplying the exact pressure to said tire, the connection of the mouthpiece of the air supply apparatus to the valve of the tire and the activation of the push-button which shows the identifying characteristics presented by the collar fixed to the valve of the tire.

Said tubular collar preferably defines on its interior surface a number of ribs which permit the fixing of the same on the valve of the tire, the fixing of said collar being performed by introducing the same on the valve; thus making very dificult the removal of the collar without causing its obstruction.

BRIEF DESCRIPTION OF THE DRAWINGS

In order to understand better the object of the present invention, a preferred practical embodiment of the same is represented in the annexed drawings. In said drawings.

DETAILED DESCRIPTION OF THE INVENTION

Figure 1:
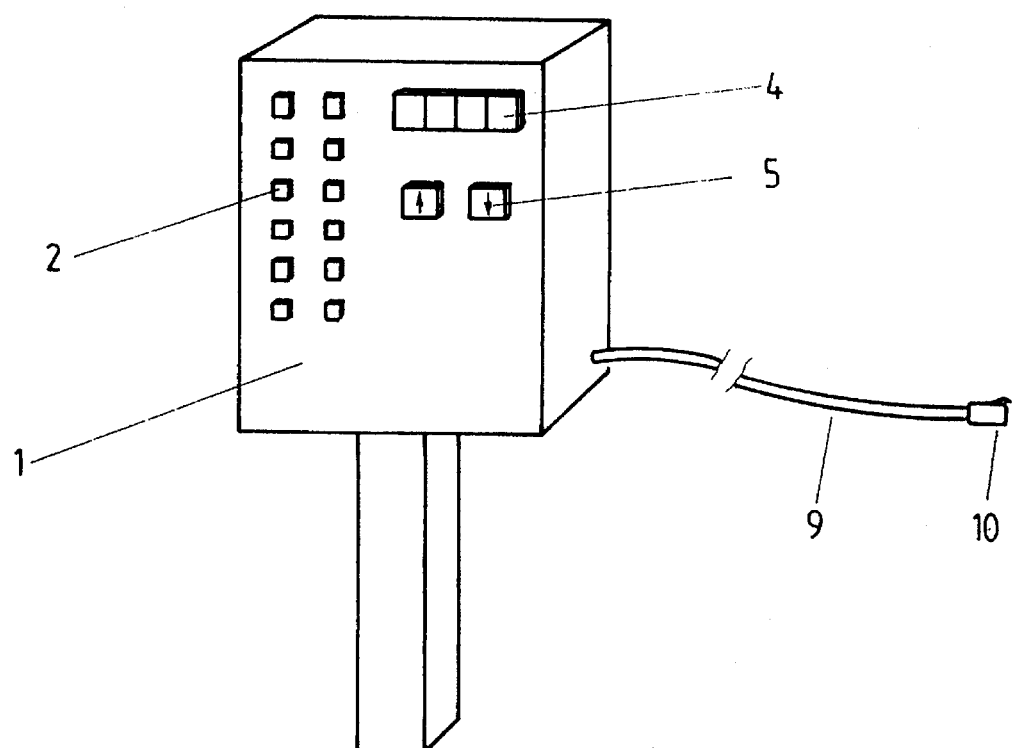
FIG. 1 shows an elevation view of the pressure air supply apparatus.
Figure 2:
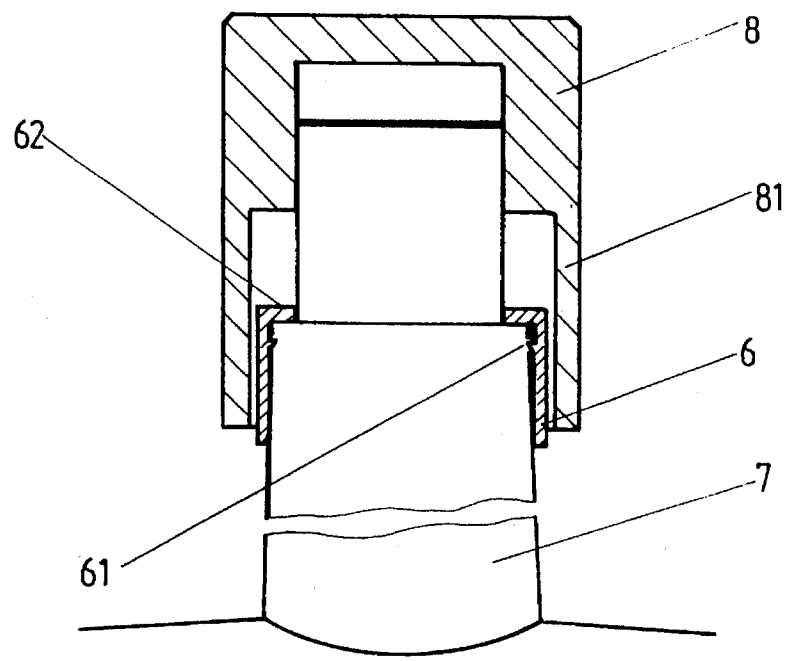
FIG. 2 shows also an elevation view of the identifiable collar cross-sectioned and mounted on the valve of a tire.
Figure 3:
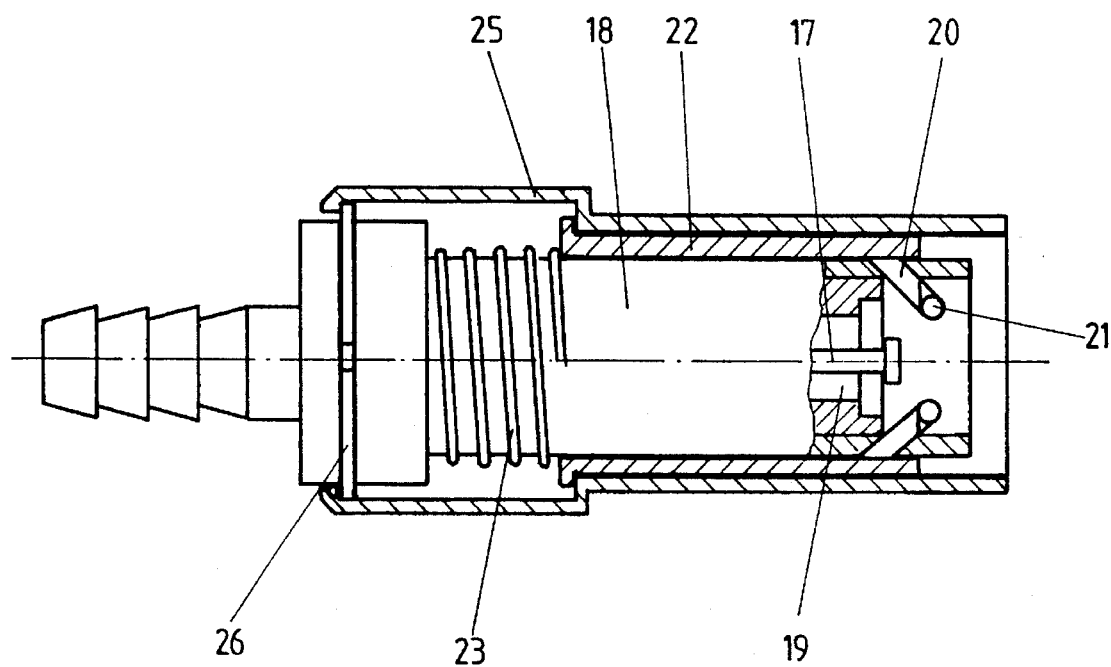
FIG. 3 shows a cross-section elevation view of one of the mouthpieces located at the air outlet of the hose.
Figure 4:
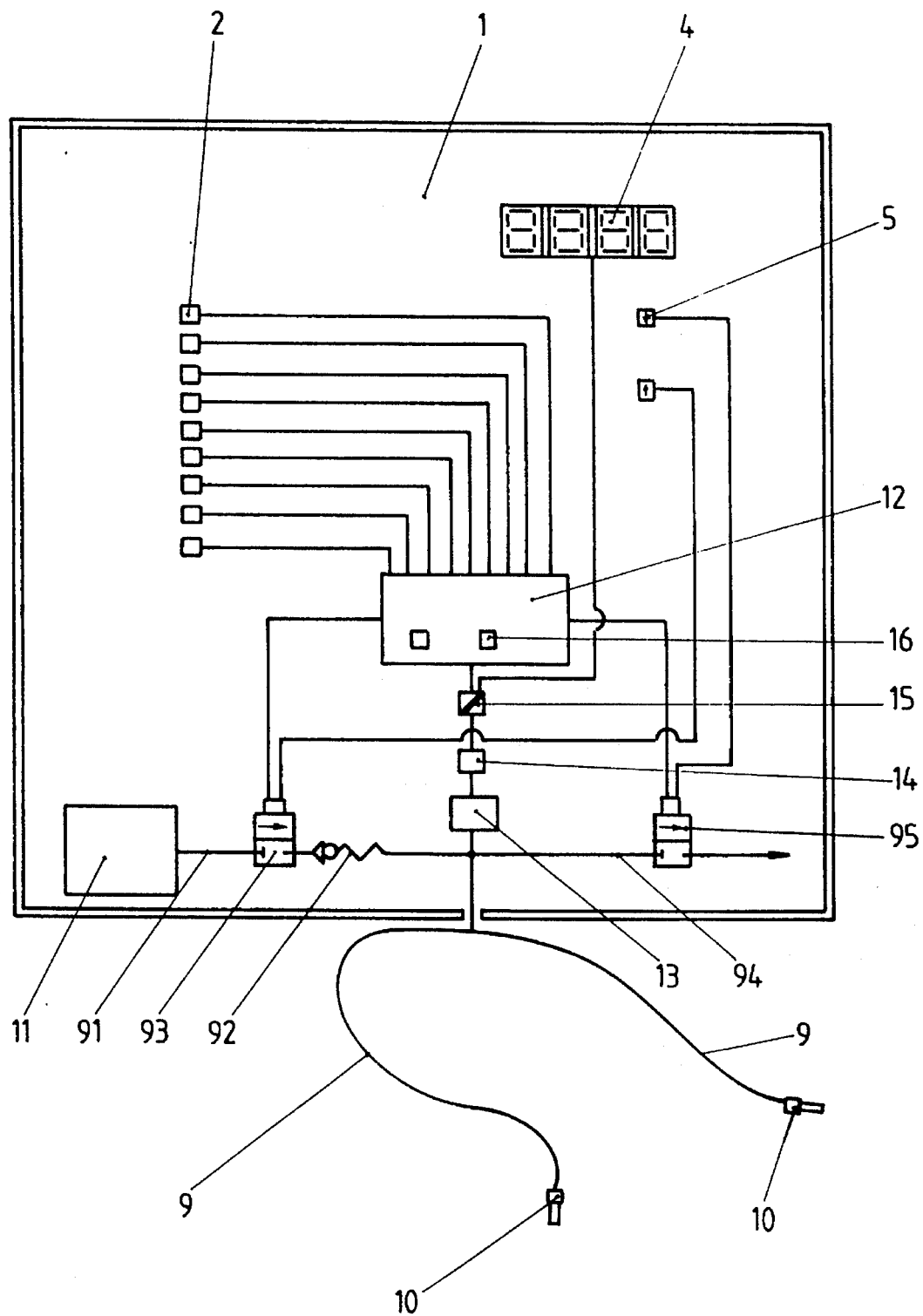
FIG. 4 is a schematic view of the elements involved in the adjustment of pressures by means of preselection of a key corresponding to a determined pressure.

As it can be observed in the referenced figures, the system of the present invention incorporates an apparatus (1) for supplying air pressure in which a plurality of push-buttons (2) are arranged, each of which presenting differentiating characteristics with resepct to the rest, be it by means of a scale of colors, codes, forms, etc, each of which in relation to control means permit the adjustment of the pressure supplied by the machine to that indicated on the manually activated push-button.

On the apparatus (1) there is a digital display (4) in which the supplied air pressure is visualized by means of successive measurements of the apparatus during the inflating process of the tire.

Additionally, the pressure air supply apparatus has two push-buttons (5) which permit the change of the pressure in use in a gradual manner, increasing progressively by activating one of the push-buttons (5) and decreasing progressively by activating the other push-button (5); permiting said push-buttons (5) to vary fix pressures obtained by means of push-button (2).

In order to facilitate the selection of push-button (2) and consequently the air pressure supplied by apparatus (1) the system is provided with a complementary collar (6), preferably tubular and made of plastic material which defines adequate dimensions in order to be introduced onto the body of the valve (7) of tires.

Due to the fact that the threaded ends of the valves (7) define a standard diameter which emerges from a portion of higher diameter, in order to prevent the collar from being easily removed after having been introduced onto the end of said valve (7), the collar defines at its inner zone at least one rib (61) arranged with an inclination and such that it permits the introduction of collar (6) by pressure onto valve (7) which presents a higher diameter which makes difficult removal of the collar because of interlocking of rib (61) over said portion. Additionally the inner surface of the collar can have an adhesive layer protected by a disposable sheet.

In a preferred embodiment valve (7) incorporates a threaded cap (8) apt for being fixed at the end of the valve, covering the opening of the same and defining an extension (81) on the periphery having sufficient length so as to cover the collar (6) when placed on the valve.

In order to facilitate a rapid selection of the appropriate push-button (2) for the necessary pressure for inflating the tire, the collar (6) should present identifying characteristics correspond to or are analogous to those of one of the push-buttons (2) be it by means of a scale of colors, an identifying code, a code of forms, etc. in such a way that once the supplying pressure onto the tire is known, a collar (6) with the corresponding identifying characterisitics of the push-button (2) is locked onto valve (7) of said tire supplying the adequate pressure to said tire.

In order to limit the penetration of collar (6) onto collar (7) the former (6) incorporates at one of the ends thereof an interior edge (62) which makes frontal contact with the step-shaped portion of the valve defined by the threaded end portion thereof and the adjacent portion with higher diameter.

The apparatus (1) may include one or two hoses (9) for the outlet of the pressure air which are fitted with a mouthpiece (10) which is intended to provide the connection of the hose (9) to valve (7) of the tire.

In the case where the apparatus (1) incorporates two hoses (9) as presented in FIG. (4), said hoses should be joined with each other as well as with a pneumatic circuit in which there is a branch (91) for the entry of pressure into hoses (9) where there is an anti-return valve (92) add an electro-valve (93) are inserted therein, said branch (91) for the entry of pressure being connected to a compressor (11); the other branch (94) of the pneumatic circuit includes an electro-valve (95) which when activated permits the discharge of the pressure of the hoses (9).

Said electro-valves (93) and (95) may be activated directly through push-buttons (5) of manual activation or through a control unit (12).

The pressure existing inside the hoses (9) is measured by means of a transducer (13) and the signal generated by the latter (13) being amplified by means of amplifier (14), said amplified signal passing thereafter through an analog-digital converter (15) and then the digitalized measurement is received by the control unit (12) which is connected to push-buttons (2) which permit the direct pre-selection of a determined pressure.

Said control unit (12) carries out a comparison between the pressure measured by the transducer (13) and the pressure corresponding to the selected push-button (2), acting depending on the data obtained from said comparison, on electro-valve (95) in order to permit a partial discharge of the pressure of said hoses (9).

Once the mouthpieces (10) are connected to the valves of tires, the control unit (12) performs a first comparison between the pressure selected by means of one of the push-buttons (2) and the pressure existing in the tires, acting subsequently on electro-valve (93) or (95), repeating successively various comparisons and the corresponding actions on electro-valves (93) and (95) until the measured pressure is approached within a pre-established margin of error, to the pressure selected by means of activating one of the push-buttons (2), said control unit (12) incorporating a zero adjusting circuit formed by two potentiometers (16).

In the case where it is desired to carry out the inflating of the two tires of the same axis or train of the vehicle, to a determined pressure, the two hoses (9) should be connected onto the same, the system thus carrying out the inflating to a pre-established pressure and the adjusting of the two tires to said pressure since the two hoses (9) are joined to each other.

In order to facilitate the connection of the mouthpieces (10) to the corresponding valves (7), it is provided that the formers (10) define a substantially cylindrical shape inside which there are automatic locking means which have a pushing rod (17) at their end and impede the outflow of the pressure when the mouthpiece (10) is not connected to the valve (7).

The central cylindrical portion (18) in which said locking means are placed presents inside and around the the rod (10) a toric joint (19) which terminates at a step-shaped end with the purpose that by locating the end of the valve (7) inside the body (18) the former (7) would act both with its front end and with its sides on the toric joint (19) impeding the outflow of air due a slight misalignment of valve (7) with respect to the central body (18).

This cylindrical body (18) presents at its front end two inclined grooves (20) in which two bars (21) are located which have the function of fixing the mouthpiece (10) onto valve (7) said bars (21) tending to be displaced towards the front zone of grooves (20) due to the action of a pushing element (22) which is pressed on its rear area by means of a spring (23).

With this arrangement, by pressing axially the mouthpiece (10) on the valve (7) the end of the latter displaces the bars (21) towards the rear zone of the grooves (20) overcoming the pressure exerted by spring (23) until the front end of the valve (7) meets with the step-shaped portion defined by the toric joint (19), thus both elements remaining immobilized due to the pressure which bars (21) exert on the threaded zone of valve (7).

Over the pushing element (22) an exterior sleeve (25) the movement of which towards the front zone is limited by a circular clip (26) in such a manner that having connected the mouthpiece (10) to the valve (7) due to the pressure exerted towards the front side by bars (21), the mouthpiece (10) can be released from valve (7) practically in an instantaneous manner.

Having sufficiently described the nature of the present invention as well as one way of putting it into practice, it only remains to be added that it possible to introduce changes in form, material and disposition in the invention as a whole or in parts of which it is composed of as long as such changes do not vary substantially the characterisitics of the invention which are claimed as follows:

What is claimed is:

1. A system for inflating tires by introducing pressurized air into a valve of said tire, said valve having one end in communication with an interior of said tire, said valve formed from a generally elongate body having a cylindrical shape and a set of standardized threads at an opposite end from said one end, said valve body defining an outside diameter which is greater than an outside diameter of said threads;

a pressure air supply apparatus which incorporates a series of push-buttons, each of which determines a different pressure deliverable to said tire upon activating the push-buttons, each push-button having its own identifying characteristics;

a series of substantially tubular, open, collars each of which defines a respective and different inside diameter dimension adequate for being mounted externally around said outside diameter of a tire valve body if said collar inside diameter is at least equal to said outside diameter of said valve body, each tubular collar having internally at least one rib which permits removably locking the collar over the threads of the tire valve body when the collar is introduced by a downward pressure around said outside diameter of the tire valve body by a system user, each collar of said series of collars having a respective identifying characteristic which coincides with those of at least one of the push-buttons, such that when a respective collar frictionally mounts around said outside diameter of said valve body, said collar characteristics identify to said system user which said push-button to pre-select and push in order to inflate said tire to a correct air pressure for that tire.

2. A system according to claim 1, further comprising a control unit which carries out successive comparisons between pressure selected by activating one of the push-buttons and pressure measured in outlet hoses by means of a transducer, in order to act, depending on the comparison carried out, upon a first electro-valve for the inlet of pressure or a second electro-valve for discharge of pressure, with the purpose of equalizing pressure supplied through the outlet hoses with the selected pressure, the control unit including an amplifier for amplifying a signal of the transducer, and an analog-digital converter for digitizing the amplified signal.

3. A system according to claim 1, further comprising two outlet hoses coupled between each other, each outlet hose coupled onto a tire valve of a corresponding train of a vehicle by means of a mouthpiece of cylindrical shape, the mouthpiece including an internally disposed locking means having elements for engaging the tire valve due to action of a pushing element pressed by a spring over which there is an externally mounted sleeve axially displaceable to effect release of the mouthpiece from the tire valve.

4. A system according to claim 1, further comprising a display on which the pressure selected by activating one of the push-buttons may be visualized.

5. A system according to claim 1, wherein the collar defines internally and at one of its ends a peripheral edge which acts as a limit point when the collar is pressed onto the tire valve body, said peripheral edge connecting with a step-shaped portion of the tire valve body defined by the threaded end portion of the tire valve body and an adjacent portion tire valve body portion with higher diameter.

6. A system according to claim 1, wherein the means for retaining the collar onto the tire valve body include at least one inclined flange disposed on an internal surface of the collar, the flange having a length sufficient for acting upon a portion of the tire valve body which is adjacent to and which has a higher diameter than a threaded end portion of the tire valve body.

7. The system according to claim 1, wherein said identifying characteristics of said push-buttons and said collars are matched to each other and are one of an identifying color, number, alphabet and code.

* * * * *